United States Patent
Harikumar et al.

(10) Patent No.: US 11,138,257 B2
(45) Date of Patent: Oct. 5, 2021

(54) OBJECT SEARCH IN DIGITAL IMAGES

(71) Applicant: Adobe Inc., San Jose, CA (US)

(72) Inventors: Midhun Harikumar, Santa Clara, CA (US); Zhe Lin, Fremont, CA (US); Pramod Srinivasan, San Francisco, CA (US); Jianming Zhang, Campbell, CA (US); Daniel David Miranda, San Jose, CA (US); Baldo Antonio Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/745,143

(22) Filed: Jan. 16, 2020

(65) Prior Publication Data

US 2021/0224312 A1   Jul. 22, 2021

(51) Int. Cl.
| | | |
|---|---|---|
| *G06F 16/532* | (2019.01) | |
| *G06F 3/0484* | (2013.01) | |
| *G06T 7/11* | (2017.01) | |
| *G06F 16/538* | (2019.01) | |
| *G06F 16/587* | (2019.01) | |
| *G06T 7/70* | (2017.01) | |

(52) U.S. Cl.
CPC ........ *G06F 16/532* (2019.01); *G06F 3/04842* (2013.01); *G06F 3/04845* (2013.01); *G06F 16/538* (2019.01); *G06F 16/587* (2019.01); *G06T 7/11* (2017.01); *G06T 7/70* (2017.01); *G06T 2200/24* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 8,572,077 | B2 * | 10/2013 | Dorfman | G01C 21/367 707/729 |
| 10,691,740 | B1 * | 6/2020 | Anorga | G06F 3/0485 |
| 2014/0172831 | A1 * | 6/2014 | Jin | G06F 16/248 707/722 |
| 2015/0177953 | A1 * | 6/2015 | Khalsa | H04N 21/4725 715/716 |
| 2017/0270215 | A1 * | 9/2017 | Mealey | H04L 67/10 |
| 2018/0197223 | A1 * | 7/2018 | Grossman | G06Q 30/0621 |

(Continued)

OTHER PUBLICATIONS

"Visually Similar Results—Pinterest", Retrieved at: https://www.pinterest.com/pin/187743878201851489/visual-search/?cropSource=1&h=222&w=374&x=30&y=492—on Dec. 2, 2019, 6 pages.

(Continued)

*Primary Examiner* — Toan H Vu
(74) *Attorney, Agent, or Firm* — Kilpatrick Townsend & Stockton LLP

(57) ABSTRACT

Object search techniques for digital images are described. In the techniques described herein, semantic features are extracted on a per-object basis form a digital image. This supports location of objects within digital images and is not limited to semantic features of an entirety of the digital image as involved in conventional image similarity search techniques. This may be combined with indications a location of the object globally with respect to the digital image through use of a global segmentation mask, use of a local segmentation mask to capture post and characteristics of the object itself, and so on.

20 Claims, 13 Drawing Sheets

(56) References Cited

U.S. PATENT DOCUMENTS

| | | | |
|---|---|---|---|
| 2019/0012716 A1* | 1/2019 | Murakami | G06F 16/532 |
| 2019/0095465 A1 | 3/2019 | Zhai et al. | |
| 2019/0121879 A1* | 4/2019 | Canelis | G06F 3/04845 |
| 2019/0163768 A1* | 5/2019 | Gulati | G06F 16/9535 |
| 2019/0205962 A1* | 7/2019 | Piramuthu | G06N 20/00 |
| 2019/0227988 A1* | 7/2019 | Kwon | G06K 9/00671 |
| 2020/0372047 A1* | 11/2020 | Wu | G06F 16/532 |

OTHER PUBLICATIONS

Zhai,"Visual Discovery at Pinterest", Mar. 25, 2017, 10 pages.

* cited by examiner

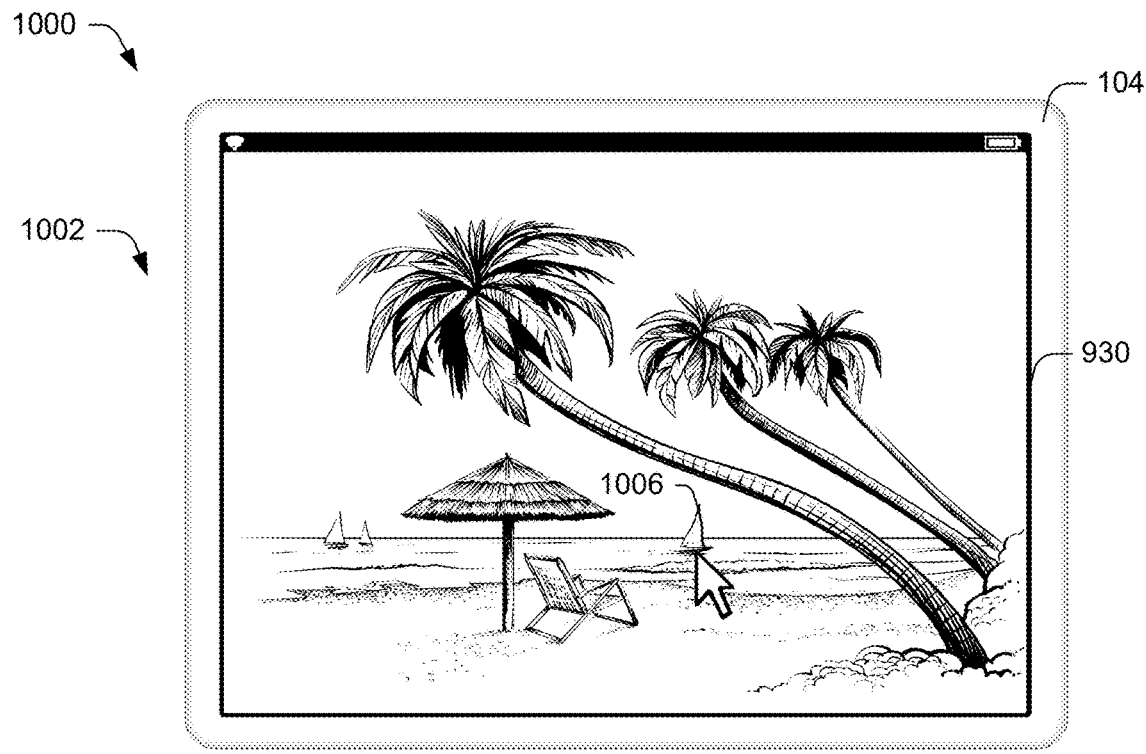
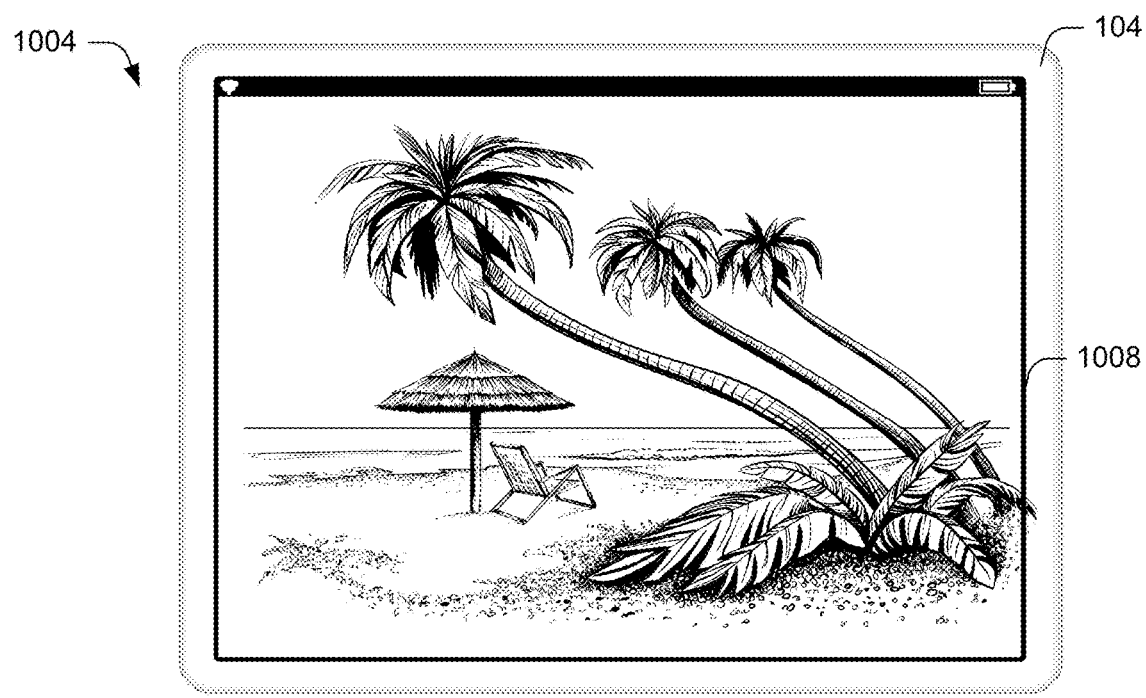
Fig. 10

1200

1202
Receive a search query formed response to an input initiated via user interaction with a user interface as selecting at least one object from a plurality of objects that are user selectable and included as part of a digital image

1204
Generate a search result responsive to the search query that includes a subsequent digital image

1206
Compare an indication of a location of the at least one object from the search query with an indication of a location of another object within the subsequent digital image

1208
Compare semantic features included in the search query that are extracted from the at least one object with semantic features extracted from the other object within the subsequent digital image

1210
Output the search query

*Fig. 12*

OBJECT SEARCH IN DIGITAL IMAGES

BACKGROUND

Digital image search based on image similarity has been developed to expand the ways in which image search systems may perform digital image searches. Conventional digital image search techniques, for instance, initially relied on text, in which, text of a search query is used to locate digital images that are tagged using the same or similar text. Therefore, these conventional techniques relied on a user's ability to express what is contained in a desired digital image using text and have that text match text used by a creator of the digital image to describe the image. Accordingly, these conventional tag-based techniques often failed in instances in which it is difficult to express what is desired in a digital image, e.g., feelings invoked by the digital image, colors, themes, and so forth.

Accordingly, image similarity techniques were developed to expand the ways in which digital images may be located. To do so, conventional techniques rely on a single representation of an entirety of a digital image in order to express what is contained in the digital image and from this determine similarity with other digital images. As such, conventional image similarity techniques are not able to support digital image searches involving what is included in particular subsections of a digital image because these conventional techniques are not able to efficiently and accurately localize objects within the digital image. Consequently, conventional image similarity techniques employed by image search systems are inaccurate and result in inefficient use of computational resources caused by repeated searches in order to locate a digital image of interest.

SUMMARY

Object search techniques for digital images are described. In the techniques described herein, semantic features are extracted on a per-object basis from a digital image. This supports location of objects within digital images and is not limited to features extracted from an entirety of the digital image as involved in conventional image similarity search techniques. This may be combined with indications of a location of the object globally with respect to the digital image through use of a global segmentation mask, use of a local segmentation mask to capture pose and characteristics of the object itself, and so on.

As such, the techniques described herein may support image similarity searches based on a particular location of an object within the digital image, a size of the object, rotation of the object, as well as an ability to specify criteria in a search query by composing objects in which objects are sized, arranged, and/or rotated as desired to locate digital images having objects that follow this criteria. These techniques may also be used to locate objects that are not the primary object in the digital image, which is not possible using conventional techniques This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 10 depicts a continued example of generating a search query that supports object removal.

FIG. 12 is a flow diagram depicting a procedure in an example implementation of performing a location aware object search based on the search query of FIG. 11.

DETAILED DESCRIPTION

Overview

Figure 1:
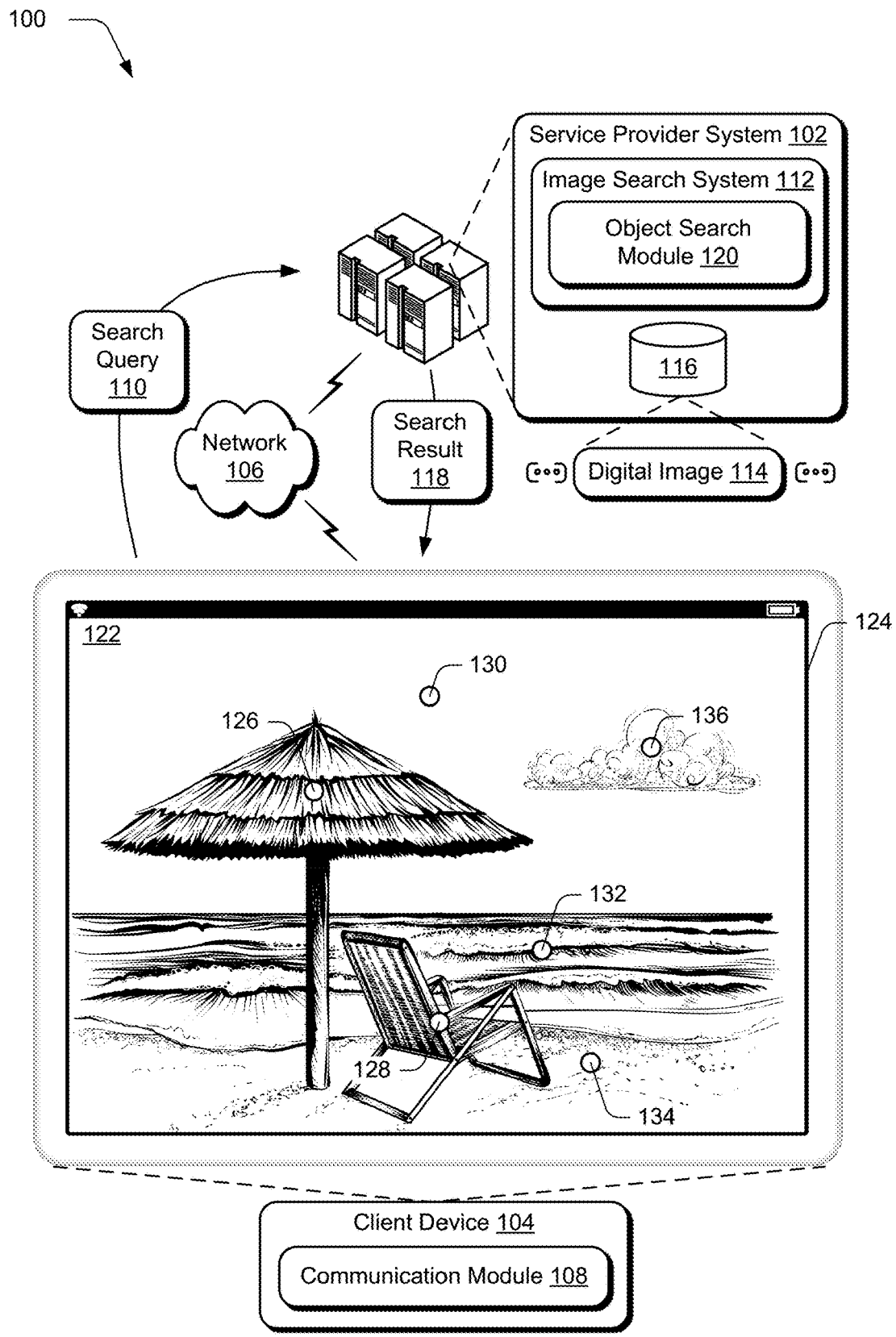
FIG. 1 is an illustration of an environment in an example implementation that is operable to employ object search techniques described herein.

Object search techniques for digital images are described that overcome the limitations, inaccuracies, and computational inefficiencies of conventional image search techniques employed by image search systems. As such, the techniques described herein may support a variety of functionality that is not possible in conventional image similarity search techniques, such as to support image similarity searches based on a particular location of an object within the digital image, a size of the object, rotation of the object, as well as an ability to specify criteria in a search query by composing objects in which objects are sized, arranged, and/or rotated as desired to locate digital images having objects that follow this criteria. These techniques may also be used to locate objects that are not the primary object in the digital image, which is not possible using conventional techniques.

In one example, a digital image is received by an image search system. The digital image is then processed by the system such that objects within the digital image are searchable with respect to other digital images, e.g., that have been processed in a similar manner. The image search system, for instance, includes an objected detection module that is configured to detect objects within the digital image and output bounding boxes identifying these objects. The object detection module may be configured in a variety of ways to do so, such as an object detector trained using machine learning to detect classes of objects, e.g., particular types of objects.

The bounding boxes indicating the objects are then passed from the object detection module to a mask generation module. The mask generation module is configured to generate a segmentation mask indicating which pixels of the digital image do and/or do not correspond to the object within the respective bounding boxes. The segmentation mask may be generated in a variety of ways, such as through use of a salient object segmentation model that is trained using machine learning, an example of which is known as Deep Lasso although other examples are also contemplated.

The segmentation masks may also be generated by the mask generation module to include global and local segmentation masks. The global segmentation mask describes a location of the object with respect to the digital image as a whole. The local segmentation mask has a greater amount of detail in order to describe characteristics of the object, itself. The local segmentation mask, for instance, is usable to describe a pose and rotation of the object but does not indicate a location of the object with respect to the overall digital image in this example.

A semantic feature generation module is then employed to generate semantic features of the objects within the digital image, e.g., to generate feature embeddings through use of machine learning by a neural network. The semantic feature generation module, for instance, may take as an input the bounding boxes generated by the object detection module for each object from the object detection module along with the segmentation masks generated by the mask generation module. From this, the semantic feature generation module first removes a background within the bounding boxes that does not correspond to the object based on the segmentation mask (e.g., as a white background) such that the background does not influence features extracted for the object.

The remaining portion of the bounding box is then processed by a content similarity model (e.g., a neural network) using machine learning to generate the semantic features as a feature embedding using machine learning. A searchable digital image module is then employed by the image search system to generate an object searchable digital image that includes the digital image along with semantic features and segmentation masks associated with the respective objects in the digital image. The object searchable digital image may then be used to support a variety of functionality, such as a basis to generate a search query and/or for inclusion as part of a search result based on a search query.

The object searchable digital image, for instance, may then be output in a user interface along with indications of which objects in the digital image are user selectable. Selection of one or more of the indications is then used to generate a search query that includes the semantic features and segmentation mask for that object. In one example, the user interface also includes an ability to reposition, resize, and/or rotate the selected object as a second user input to a desired location with respect to the digital image, which is used to update the segmentation mask for inclusion as part of the search query.

The search query including the semantic features and segmentation mask is then used by a search module to locate digital images that include similar objects at similar locations, sizes, and/or rotations within other digital images. A variety of other searches may also be performed by the image search system leveraging this functionality, such as a semantic object search, image similarity searches that involve removing objects, location-only search, shape searches, isolated object searches, combination query searches, and so on. As a result, a variety of image searches may be implemented that are not possible using conventional techniques, such as to locate objects that are not salient within a digital image, which is not possible using conventional techniques that rely on features of the digital image as a whole. Further discussion of these and other examples is included in the following sections and shown using corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium image search environment 100 in an example implementation that is operable to employ techniques described herein. The illustrated environment 100 includes service provider system 102 and a client device 104 that are communicatively coupled, one to another, via a network 106. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown and described in some instances, a computing device may be representative of a plurality of different computing devices, such as multiple servers utilized by a business to perform operations "over the cloud" as shown for the service provider system 102 and as further described in relation to FIG. 13.

The client device 104 includes a communication module 108 (e.g., a browser, network-enabled application, plug-in module, and so on) in the illustrated example that is configured to generate a search query 110. The search query 110 is illustrated as communicated to the service provider system 102 via the network 106. An image search system 112 is then configured to search a plurality of digital images 114 stored in a storage device 116, and from this, generate a search result 118 for communication back to the client device 104. Other examples are also contemplated in which the search query 110 and search result 118 are generated locally on a single computing device.

The image search system 112 also includes a object search module 120 that is representative of functionality implemented by a computing device to perform a search of the digital images 114 based on image similarity of objects contained within the digital images 114. The object search module 120, for instance, may be used to generate a search query 110 that is used to perform the search and/or configure the digital images 114 to be searchable for generating a search result 118 in response to the search query 110.

The client device 104, for instance, displays a digital image 122 in a user interface by a display device 124. The digital image 122 includes indications (examples of which are illustrated as "hot spots" using circles) of objects within the digital image 122 that are user selectable for use as part of a search query 110. A user input, for instance, may be received via a gesture, spoken utterance, cursor control device, and so on to select objects such as an umbrella 126, chair 128, sky 130, water 132, beach 134, or cloud 136. The search query 110, based on the user-selected object, is used by the image search system 112 to locate digital images 114 having the same or similar objects based on image similarity of the object in the digital image 114 to the object of the search query 110. In this way, the image search system 112 is not limited to comparison of digital images as a whole as performed in conventional image similarity techniques.

The image search performed by the image search system 112 may also take into account location of objects within the digital image to perform the search through use of the object search module 120. The search query 110, for instance, may specify a desired location of the chair 128. Accordingly, search results 118 generated by the object search module 120 may include digital images 114 having similar chair at a similar location based on image and location similarity. As a result, the object search module 120 supports image search functionality that is not possible using conventional techniques. Examples of this functionality include a semantic object search, image similarity searches that involve removing objects, location-only search, shape searches, isolated object searches, combination query searches, an ability to locate non-salient objects within a digital image, and so on. Further examples of generating object searchable digital images and use of the object searchable digital images is included in the following sections.

In general, functionality, features, and concepts described in relation to the examples above and below may be employed in the context of the example procedures described. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Searchable Digital Image Generation

Figure 2:
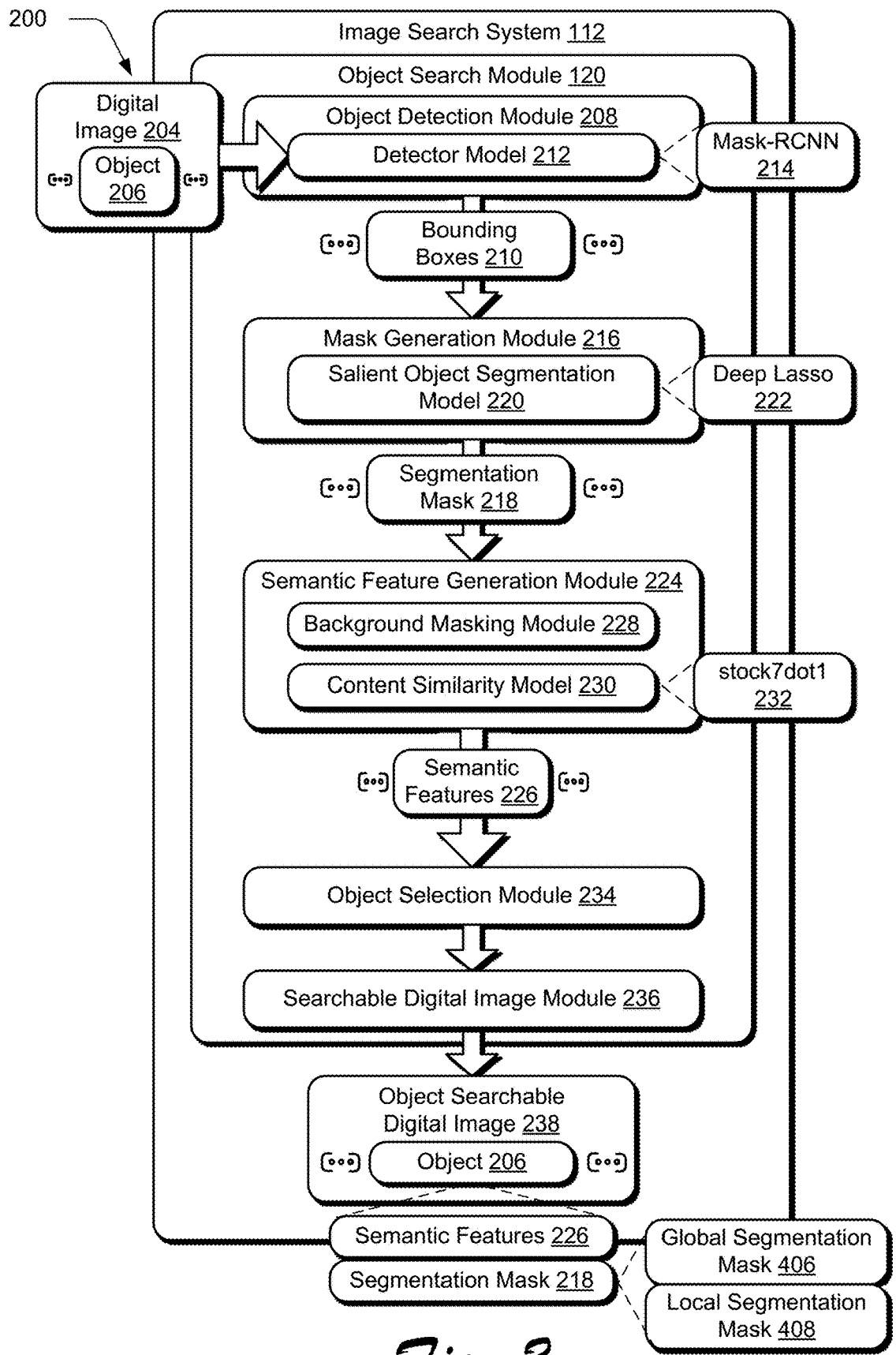
FIG. 2 depicts a system in an example implementation showing operation of the object search module of FIG. 1 in greater detail as generating an object searchable digital image that is usable to initiate a search query and/or is searchable in response to a search query to generate a search result.
Figure 3:
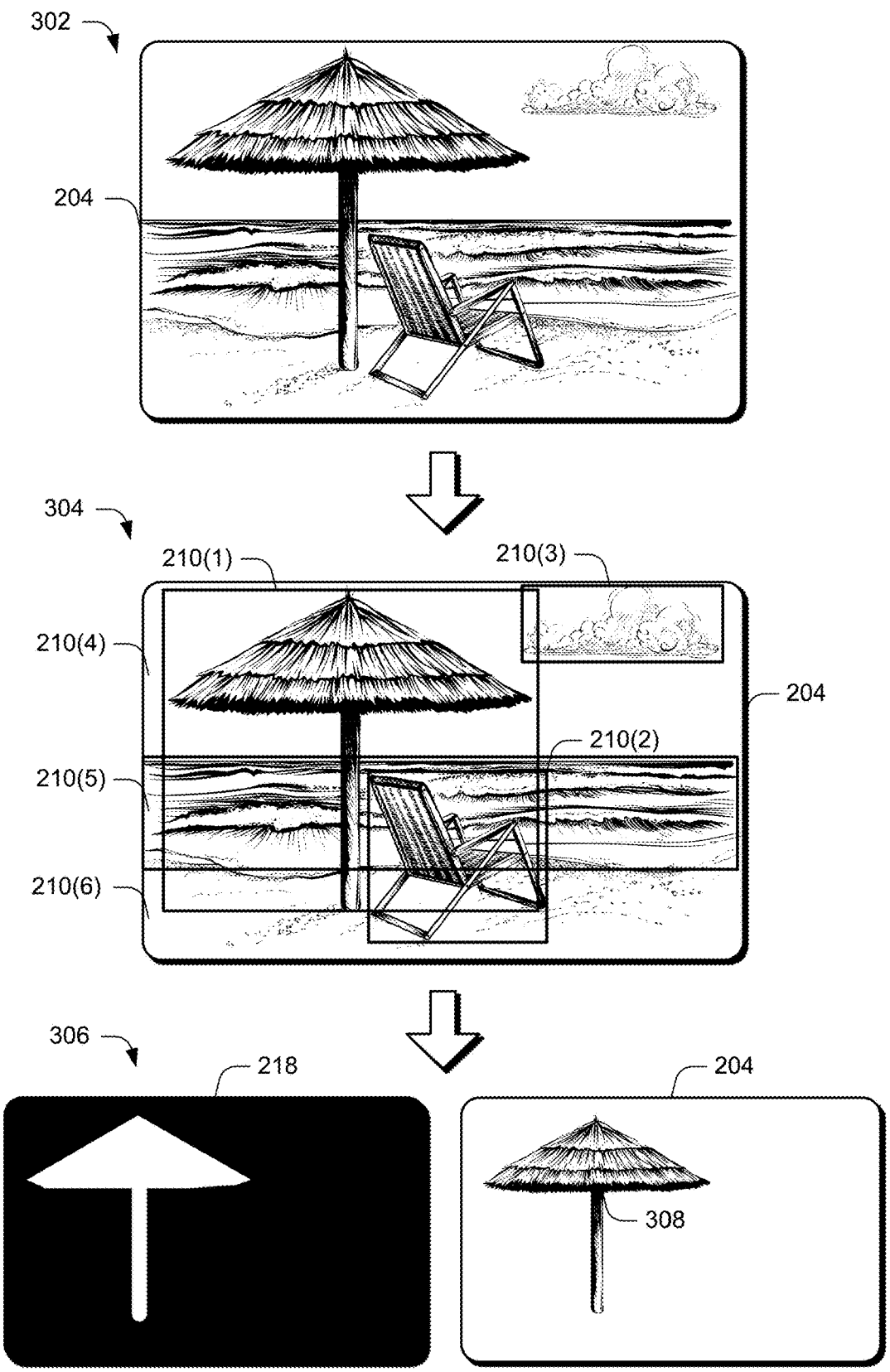
FIG. 3 depicts an example implementation of object detection and generation of segmentation masks from a digital image.
Figure 4:
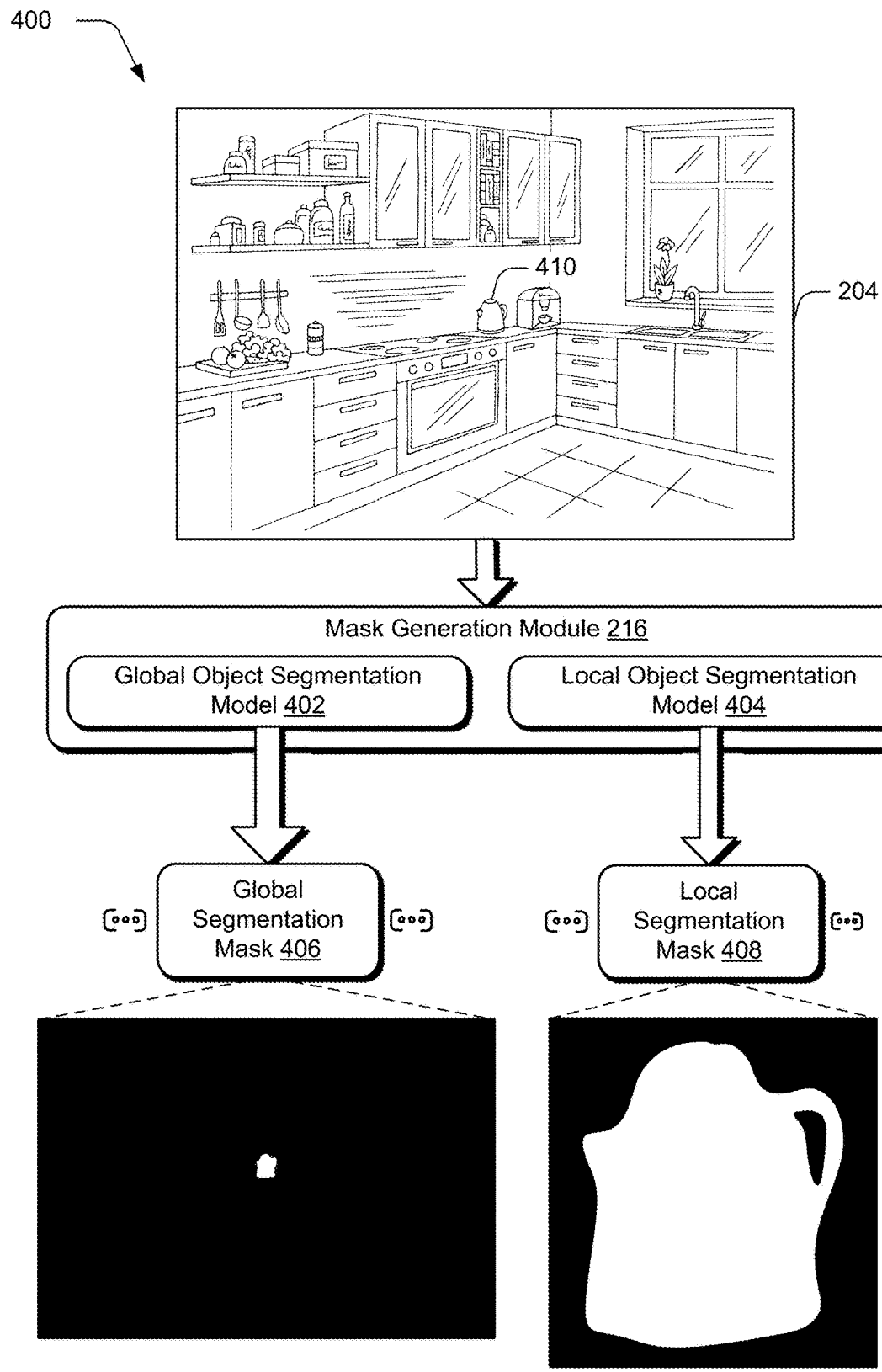
FIG. 4 depicts an example implementation of generating global and local segmentation masks for an object identified in a digital image.
Figure 5:
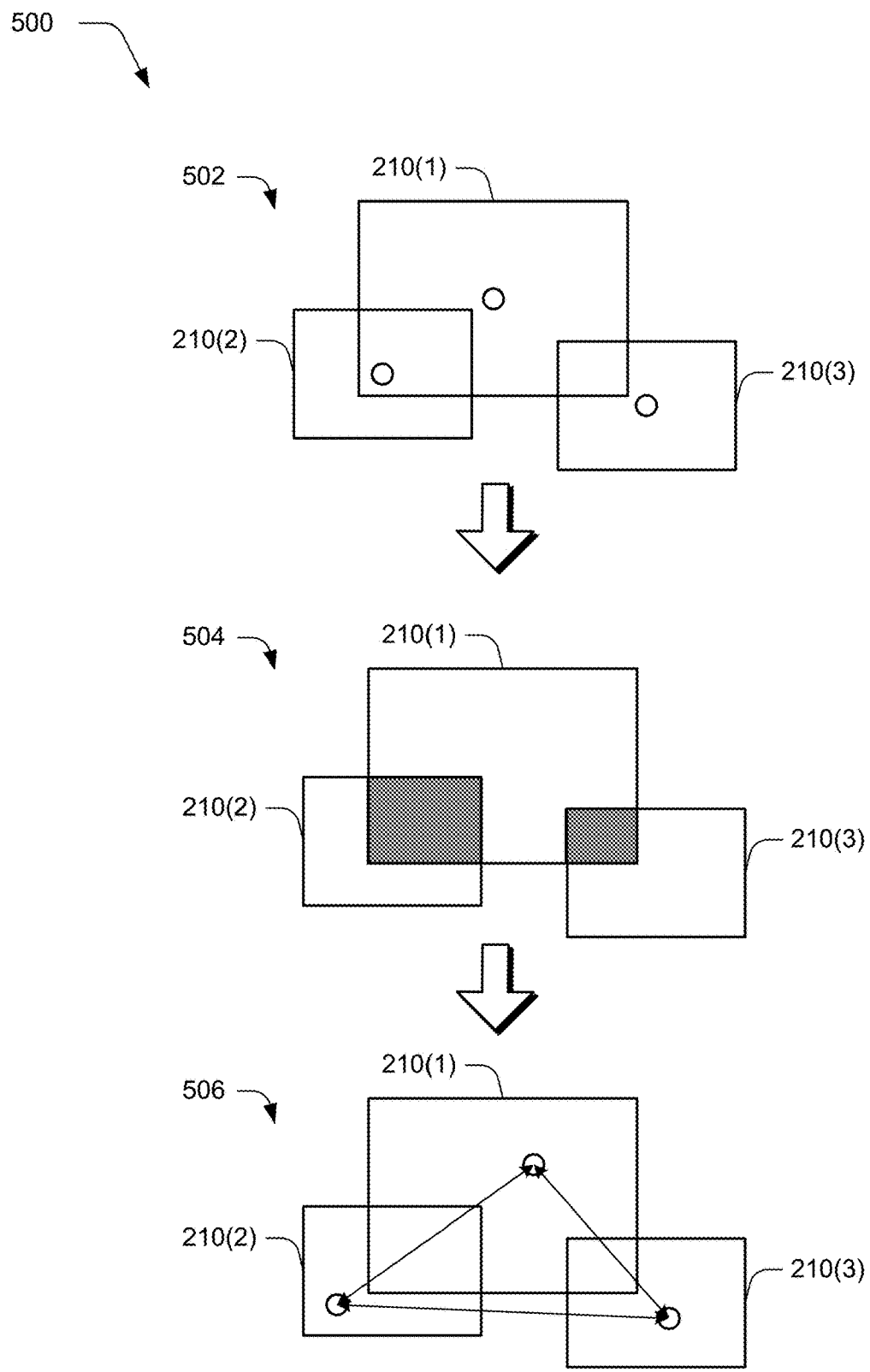
FIG. 5 depicts an example implementation of determining location of indications that are user selectable to select a corresponding object from a digital image for use as part of a search query.
Figure 6:
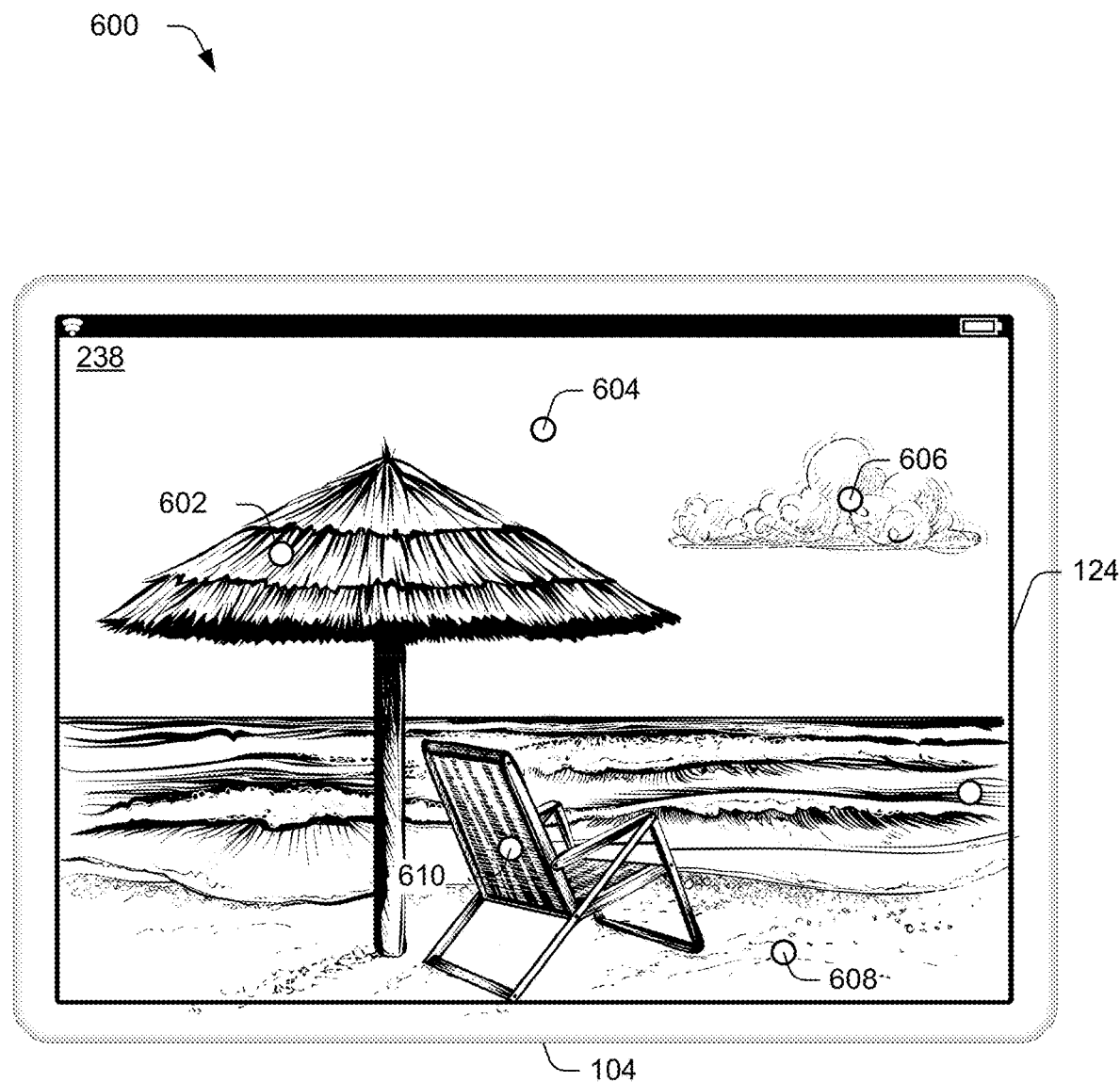
FIG. 6 depicts an example implementation of an object searchable digital image usable to initiate a search query.
Figure 7:
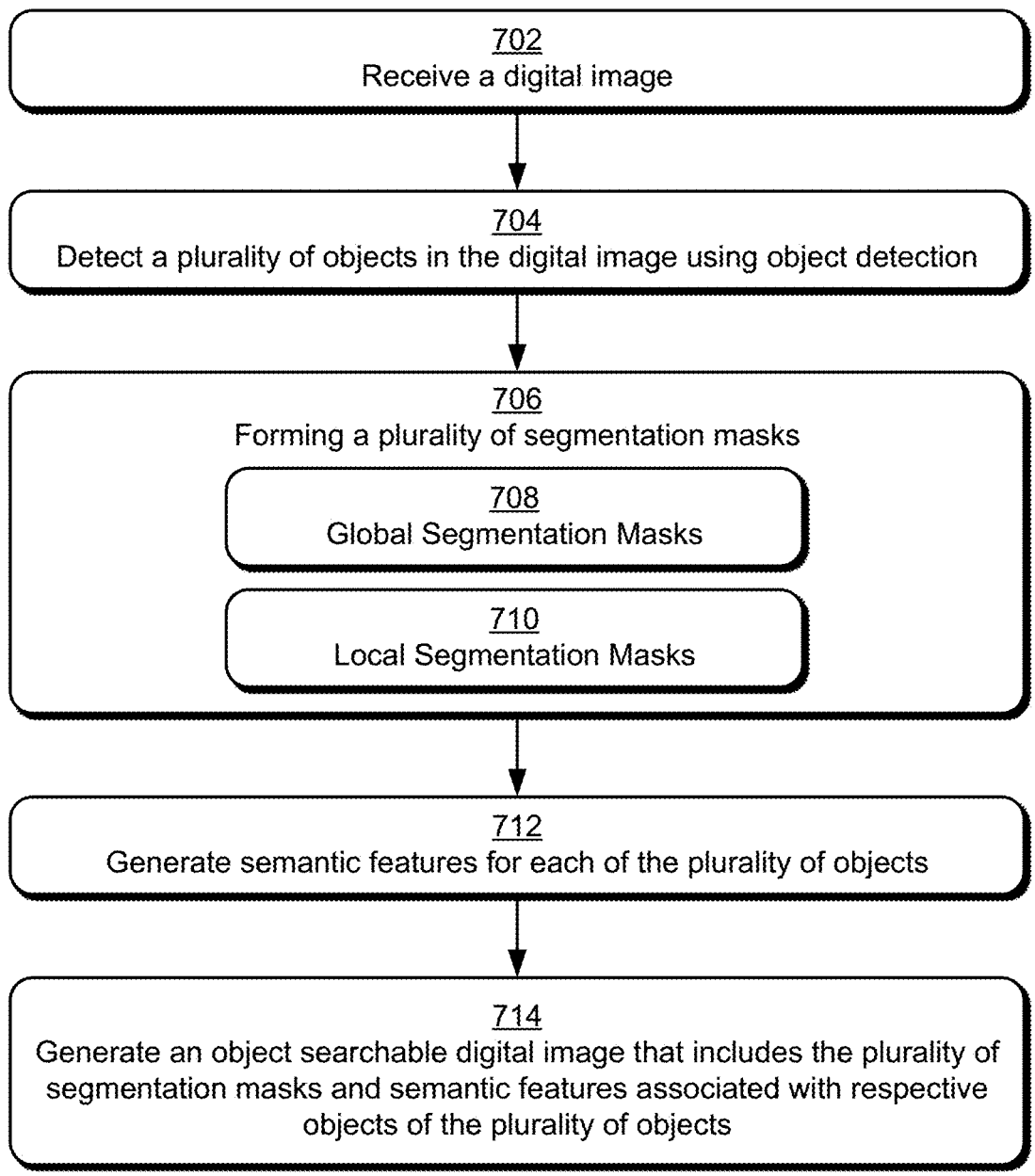
FIG. 7 is a flow diagram depicting a procedure in an example implementation of generating an object searchable digital image.

FIG. 2 depicts a system 200 in an example implementation showing operation of the object search module 120 in greater detail as generating an object searchable digital image 202 that is usable to initiate a search query 110 and/or is searchable in response to a search query 110 to generate a search result 118. FIG. 3 depicts an example implementation 300 of object detection and generation of segmentation masks from a digital image using first, second, and third stages 302, 304, 306. FIG. 4 depicts an example implementation 400 of generating global and local segmentation masks for an object identified in a digital image. FIG. 5 depicts an example implementation 500 of determining location of indications that are user selectable to select a corresponding object from a digital image for use as part of a search query depicts using first, second, and third stages 502, 504, 506. FIG. 6 depicts an example implementation 600 of an object searchable digital image usable to initiate a search query 110. FIG. 7 depicts a procedure 700 in an example implementation of generating an object searchable digital image.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

In this example, digital images are processed by the object search module 120 such that the images are usable to generate a search query 110 and/or searchable in response to a search query 110. To begin, a digital image 204 is received (block 702) that includes a plurality of objects 206 included within the digital image 204, an example of which is depicted at the first stage 302 of FIG. 3. The plurality of objects 206, for instance, are formed using a subset of pixels of the digital image 204 that is less than an entirety of the digital image 204.

An object detection module 208 is then used to detect the plurality of objects 206 in the digital image 204 using object detection as part of machine learning (block 704). The object detection module 208, for instance, may employ a detector model 212 trained using a variety of classes (e.g., 500 classes) from a training dataset of digital images to detect objects. An example of a detector model 212 is referred to as a Mask-RCNN 214, however other examples are also contemplated.

The detector model 212, for instance, may form bounding boxes 210(1), 210(2), 210(3), 210(4), 210(5), and 210(6) around corresponding objects in the digital image, e.g., an umbrella, chair, cloud, sky, ocean, and beach in the illustrated example at the second stage 304 of FIG. 3. Each of these objects, for instance, may correspond to a class for which the detector model 212 is trained.

The bounding boxes 210 are then passed from the object detection module 208 to a mask generation module 216. The mask generation module 216 is configured to form a plurality of segmentation masks (block 706), each segmentation mask corresponding to a respective object of the plurality of objects as indicated by the bounding boxes 210. The mask generation module 216, for instance, may employ a salient object segmentation model 220 that is configured to indicate which pixels in the corresponding bounding boxes 210 correspond to a respective object and which do not. An example of a salient object segmentation model 220 is referred to as a Deep Lasso 222 model.

As depicted in the third stage 306 of FIG. 6, the segmentation mask 218 indicates which pixels correspond to the object (e.g., the umbrella) using a white color and which pixels do not using a black color, although other examples are also contemplated such as to indicate probabilities of corresponding to a respective class using grayscale. In this way, the segmentation mask 218 may be used to differentiate between pixels 308 that correspond to the umbrella and which pixels do not in the digital image 204.

The segmentation masks 218 may be generated in a variety of ways by the mask generation module 216 to describe a variety of characteristics of corresponding objects, e.g., of the objects themselves, in relation to the digital image 204 as a whole, and so forth. In the example 400 depicted in FIG. 4, for instance, the mask generation module 216 includes a global object segmentation model 402 and a local object segmentation model 404 that are configured to generate a global segmentation mask 406 and a local segmentation mask 408 for respective objects in the digital image 204 (block 710). The global segmentation mask 406 is configured to indicate a location of the object, e.g., a kettle 410 in this instance, with respect to the digital image 204 as a whole, and in this way describes a coarse pose and location of the object.

The local segmentation mask 408, on the other hand, has an amount of resolution for depicting the object 402 that is greater than the resolution used for the global segmentation mask 406. The local segmentation mask 408, for instance, may correspond to a respective bounding box 210, and from this, indicate which pixels do and do not correspond to the object. In this way, the local segmentation mask 408 describes a fine pose, rotation, and other characteristics of the object, e.g., to show a handle of the kettle 410 that is not readily discernable in the global segmentation mask 406. These masks may be computed for each object identified in the digital image 204, for a predetermined number of top ranked objects, and so on. In an implementation, the global segmentation mask and the local segmentation mask 408 are each described using a vector, e.g., 1024 dimensional vectors.

The segmentation masks 218 are then passed from the mask generation module 216 to a semantic feature generation module 224. The semantic feature generation module 224 is representative of functionality to generate semantic features 226 for each of the plurality of objects, separately, based on the plurality of segmentation masks (block 712). To do so, a background masking module 228 is configured to remove a background. This is performed to remove an effect of the background of the digital image on the semantic features 226 generated for a respective object. The segmentation masks 218, for instance, are inverted to "white out" a background, e.g., of the digital image 204 as a whole for a global segmentation mask 406 and/or portions of a bounding boxes 210 for a local segmentation mask 408. This results in a respective object 206 being shown alone a white background for the digital image 204, as shown for the umbrella 308 at the third stage 306 of FIG. 3.

A content similarity model 230 is then employed to generate the semantic features 226, e.g., through use of a neural network. The content similarity model 230, for instance, may generate the semantic features as a deep neural network feature representation trained for image classification or image tagging that generates a 2048-dimensional vector to capture semantic properties of a respective object 206, e.g., through use of a Stock7Dot1 232 feature space of a neural network.

In instances in which the digital image 204 is to be used as a basis for generating a search query, an object selection module 234 is employed to generate indications of which objects are user selectable in the digital image 204. As shown at a first stage 502 of FIG. 5, in some instances a centroid of respective bounding boxes 210(1), 210(2), 210 (3) may intersect another bounding box and thus is not selectable or viewable. Accordingly, techniques may be employed to specify placement of these indications to protect from intersections and overlap.

As shown at a second stage 504 of FIG. 5, intersecting portions of the bounding boxes 210(1), 210(2), 210(3) are first removed, which are illustrated in gray. A joint optimization is them performed as shown at the third stage 506 in which a distance transform is performed on the segmentation mask/bounding box by the object selection module 234 to extract a subset of pixels, e.g., the top 85 percentile. Random sampling is then performed to sample a pixel from remaining pixels for the objects a compute a distance between the "N" pixels for respective objects. This is performed randomly for "K" iterations and a set of pixels is selected that maximized a distance between the pixels for the objects. These pixels are then used to place indications that are user selectable to generate a search query as further described below.

A search digital image module 236 is then employed to generate an object searchable digital image 328 that includes the plurality of segmentation masks 218 and semantic features 226 associated with respective objects of the plurality of objects 206 (block 714). For example, the object searchable digital image 238 may be formed to include metadata as follows:
Object-1
Semantic Feature Vector
Global Mask Vector
Local Mask Vector
Object-2
Semantic Feature Vector
Global Mask Vector
Local Mask Vector
Object-N
Semantic Feature Vector
Global Mask Vector
Local Mask Vector An example of an object searchable digital image 238 is shown in FIG. 6 in which indications 602, 604, 606, 608, 610 are output to specify which objects are user selectable via a display device 124 of the client device 104.

Thus, in the above example, the digital image 204 first passes through a detector model 212 of the object detection module 208 to generate bounding boxes 210, which may also include detection confidences and class labels for objects in an image. In some instance, the detector model 212 is trained on hierarchical classes and as a result multiple bounding boxes 210 may appear over the same object. Accordingly, the classes may be stripped from the detections and detector model 212 may be implemented again to obtain a set of nonoverlapping bounding boxes over the salient objects.

Conventional understanding may indicate that filtering based on high confidence detection boxes is likely to achieve better overall accuracy. In practice, however, it is observed that richer result may be achieved by including non-salient objects from the digital images even if class label score is low, as detection of the object itself is desired. Accordingly, a threshold number of objects per digital image may be specified, e.g., ten. This is a precaution to prevent images with dense scenes from returning a number of objects that is not user discernable. The object searchable digital image 238 is thus configured to initiate a search query that supports a variety of functionality not possible using conventional techniques as further described in the following section.

Digital Image Search

Figure 8:
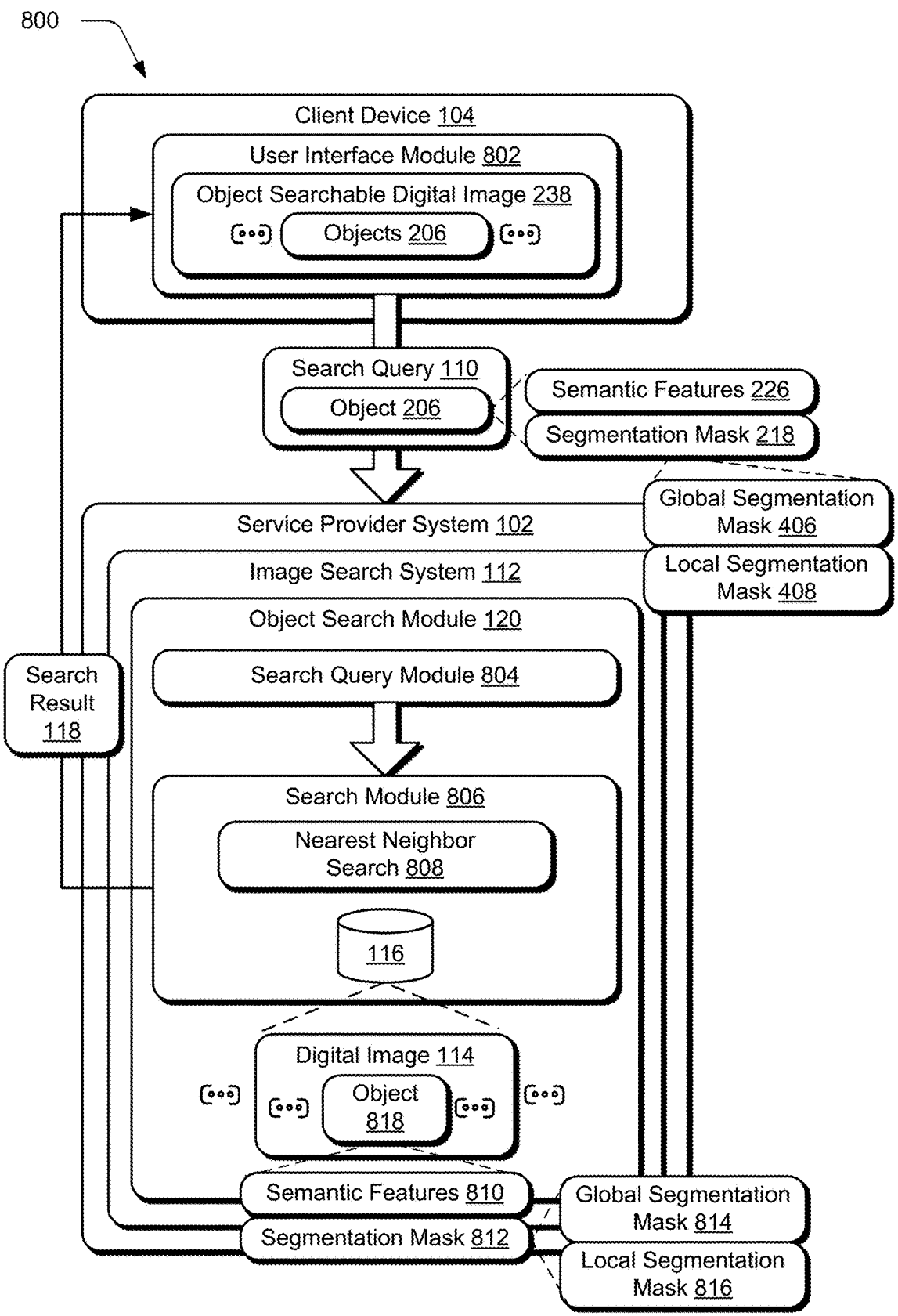
FIG. 8 depicts a system in an example implementation in which a search query is generated and used to perform a location aware object search in digital images.
Figure 9:
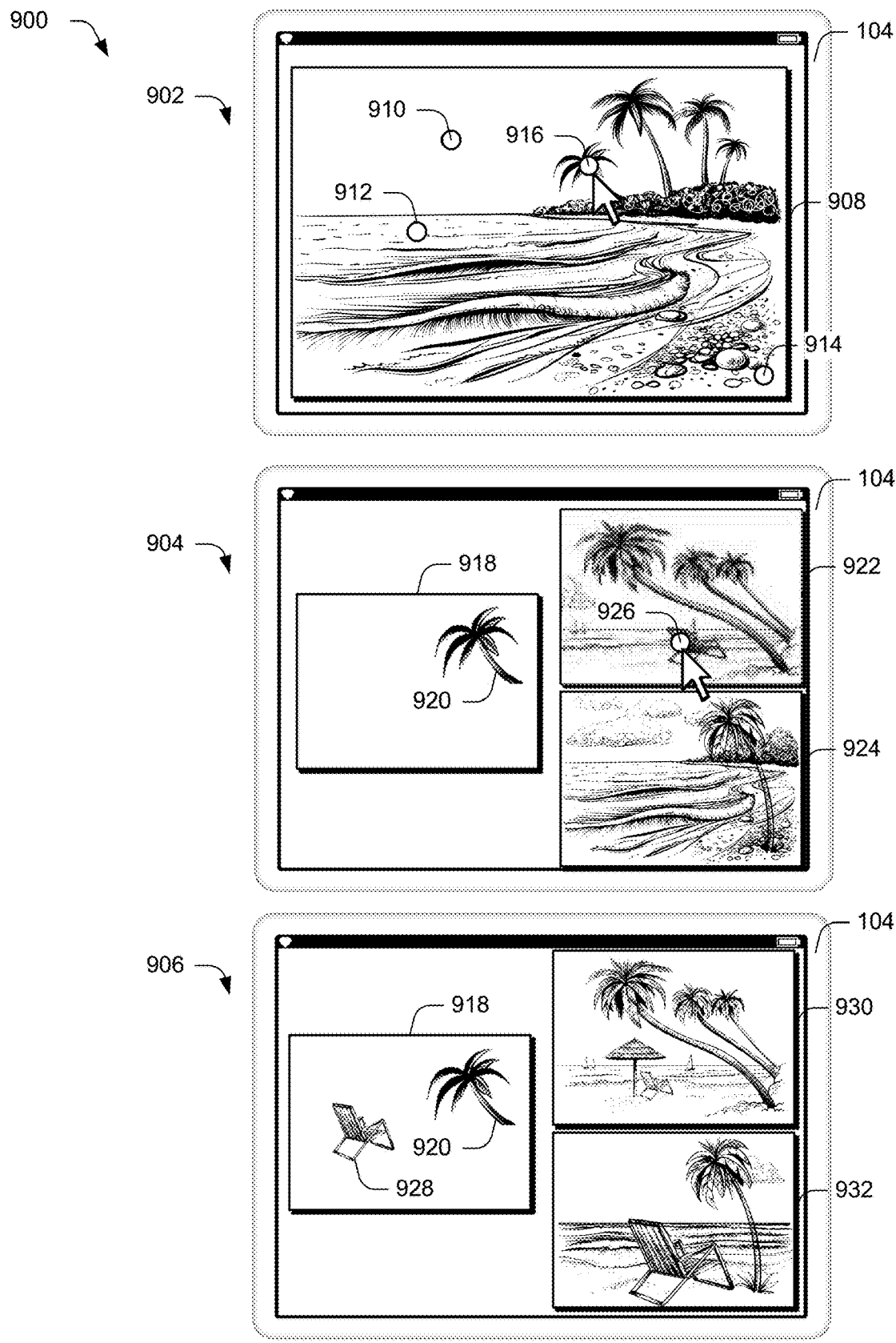
FIG. 9 depicts an example of generating a search query supporting location aware object search as including objects from multiple digital images and user-specified composition of the objects.
Figure 11:
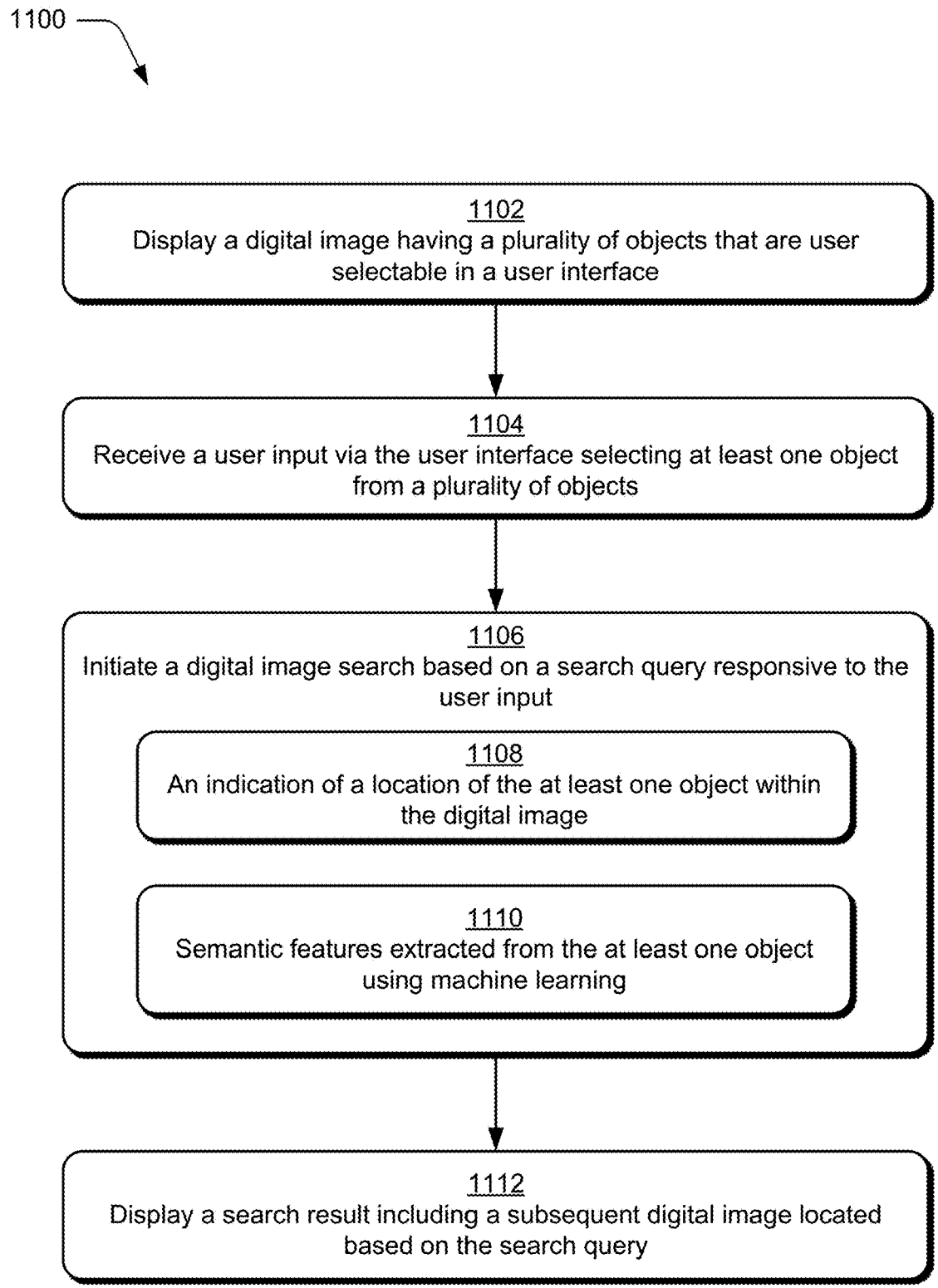
FIG. 11 is a flow diagram depicting a procedure in an example implementation of generating a search query.

FIG. 8 depicts a system 800 in an example implementation in which a search query is generated and used to perform a location aware object search of digital images. FIG. 9 depicts an example 900 of generating a search query that supports location aware object search as including objects from multiple digital images and user-specified composition of the objects using first, second, and third stages 902, 904, 906. FIG. 10 depicts a continued example 1000 from FIG. 9 of generating a search query that support object removal using first and second stages 1002, 1004. FIG. 11 depicts a procedure 1100 in an example implementation of generation and use of a search query. FIG. 12 depicts a procedure 1200 in an example implementation of performing a location aware object search based on the search query of FIG. 11.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 8-12.

To begin in this example, an object searchable digital image 238 is displayed by a user interface module 802 of a client device 104, the image having a plurality of objects that are user selectable in a user interface (block 1102). The object searchable digital image 238, for instance, may be user uploaded, retrieved in response to a text and/or image similarity digital image search, and so on. As shown at the first stage 902 of FIG. 9, an object searchable digital image 908 includes an indication 910 to select a sky, an indication 912 to select water, an indication 914 to select a beach, and an indication 916 to select a palm tree.

Reception of a user input via the user interface selecting at least one object from the plurality of objects (block 1104) causes output of a composition user interface 918 that includes the selected object 920 as shown at the second stage 904. User inputs may be received via the composition user interface 918 to reposition, resize, rotate, or otherwise modify the selected object 920 with respect to an overall location within a digital image. In this way, a user may specify a desired location of an object, size of the object, and rotation of the object that is then used as a basis by the user interface module 802 to generate a search query 110.

The search query 110 is used to initiate a digital image search (block 1106) and includes an indication of a location of the at least one object 206 within the digital image (block 1108) and semantic features 226 extracted from the at least one object using machine learning (block 1110). The indication of the location, for instance, may be specified by a segmentation mask that indicates a global position with respect to an entirety of the digital image, e.g., as a global segmentation mask 406. This may be generated for an original position of the object within the digital image and may be updated based on any further user inputs received that modify a location, size, and/or rotation of the object via the composition user interface 918. The search query 110 may also include a local segmentation mask 408 that is used to specify finer-grained details of the object 206, such as a pose, rotation, and so on.

The semantic features 226 may be formed as a semantic feature vector (e.g., having 2048 dimensions) generated using feature extraction as part of machine learning, e.g., via a neural network. Likewise, the global segmentation mask 406 is generated as a global feature vector (e.g., having 1024 dimensions) and the local segmentation mask 408 is generated as a local feature vector (e.g., also having 1024 dimensions) as described in the previous section. In the illustrated example of FIG. 8, the search query 110 is communicated by the client device 104 via a network 106 to the service provider system 102 to perform the digital image search. However, other examples are also contemplated, e.g., in which generation of the search query and performance of the search are performed locally on a single computing device.

Continuing with the above example, the search query 110 is received by a search query module 804 of the service provider system 102. The search query 110 is formed responsive to an input initiated via user interaction with a user interface as selecting at least one object (e.g., an indication 916 associated with a palm tree) from a plurality of objects that are user selectable and included as part of a digital image 908 (block 1202). The user input, for instance, may be received via selection of the indication using a cursor control device, a gesture, spoken utterance, as part of an AR/VR environment, and so forth.

The search query 110 is passed from a search query module 804 to a search module 806 that is representative of functionality to generate a search result 118 that includes a subsequent digital image (block 1204), e.g., from digital images 114 available via an image repository. Generation of the search result 118 by the search module 806 includes comparing an indication of a location of the at least one object from the search query with an indication of a location of another object within the subsequent digital image (block 1206). This also includes comparing sematic features included in the search query that are extracted from the at least one object with semantic features extracted from the other object within the subsequent digital image (block 1208). The search result 118 is then output (block 1210).

This comparison and search may be performed in a variety of ways, such as to compare respective vectors of the search query 110 to objects 818 included in the digital image 114 by the search module 806 in a vector space using a nearest neighbor search 808. The nearest neighbor search 808, for instance, may include comparing vectors generated for semantic features 226 and the segmentation mask 218 (e.g., which may include global and local segmentation masks 406, 408) with vectors generated for semantic features 810 and segmentation masks 812 (e.g., which may also include global and local segmentation masks 814, 816) of objects 818 included in digital images 114 in the storage device 116.

Distances of the vectors to each other is then used as a basis to determine similarity of the object 818 to objects in the digital images 114. The search module 806, for instance, may rank the objects 818 based on similarity to the object 206 of the search query and generate the search result 118 based on this ranking. The search result 118 is then communicated back to the client device 104 via the network 106. The user interface module 802 is then used to output the search result 118 including the subsequent digital image located based on the search query 110 in a user interface (block 1112). This may be used to further refine the search query 118 and repeat this process by initiating another digital image search.

Returning again to the second stage 904 of FIG. 9, a search query was generated based on a selected object 920 of a palm tree. The search query includes semantic features and a location of the selected object within the digital image, which is illustrated in a composition user interface 918. The selected object 920 as previously described may be resized, moved, rotated or otherwise modified for use as part of the search query. Digital images 922, 924 are then output as part of a search result based on this search query, which as illustrated include similar objects (e.g., palm trees) positioned at similar locations within the digital images. In this way, the techniques described herein support location aware object search which is not possible using conventional global comparison techniques.

The search query may continue to be modified based on the image searches. A user input, for instance, may be received selecting an indication 926 of a beach chair for inclusion as part of the search query, which is illustrated as a second selected object 928 together in the composition user interface 918 with the selected object 920 at the third stage 906. These objects may also be modified, such as to specify a relationship of the objects to each other, sizing, location, rotation, and so forth. This is then used as a search query to generate a search result that includes digital images 930, 932.

Thus, this example involves a combination search query of location and content embeddings is used to perform a location aware object search. This may also be performed to remove objects included in a search result from a search query, e.g., as a negative weighting. As shown at a first stage 1002 of FIG. 10, a subsequent digital image 930 is illustrated as received in a search result in response to the search query generated using the composition user interface 918 of the third stage 906 of FIG. 9. The digital image 930 also includes an indication 1006 of a selectable object, which in this instance is a sailboat. Selection of the indication 1106 and an associated option (e.g., via a drop-down menu) indicates that this object is not desired for inclusion in the search query. Accordingly, this object and associated metadata may be given a negative weighting as part of a search query, thereby resulting in a subsequent digital image that includes the palm tree and chair in this example but does not include sailboats. In this way, the techniques described herein may support rich and accurate digital image searches that are not possible using conventional techniques as further described in the following sections.

Semantic Object Search

In a first example, an object similarity search is supported by the search module 806 using the semantic features 226 generated for the object 206, e.g., using a deep neural network. This differs from conventional techniques in that a nearest neighbor search 808 is performed for the objects included in the images, themselves, rather than for the digital image as a whole. This supports a search result having increased diversity as opposed to a comparison of features extracted from the digital image in their entirety. Further, the object 206 that is a subject of the search query 110 need not be the salient object in the digital image 204. This overcomes conventional isolated image results and also supports flexibility to mix and compose isolated objects as described in the above example. Additionally, removal of the background as described above supports search results having varied backgrounds and scenes and thus supports image diversity in the search result that is not possible using conventional techniques.

Semantic and Location Search

As previously described, the global segmentation masks (e.g., a global mask embedding) indexed for each object 206 in each image 204 act as a location search vector that indicates a location of the object with respect to the digital image as a whole. Therefore, performance of a distance computation by the search module 806 using a nearest neighbor search 808 between embeddings supports location aware search. In practice this means that a coffee cup on the top right of an image will have a mask on the top right of the image. Nearest neighbors of the mask embedding are therefore objects that have a mask corresponding to that location.

In order to combine the location with semantic features in one example, a semantic embedding search is performed by the search module 806 and top "N" results are taken, e.g., a few million digital images. The results are then weighted by a nearest neighbor score from a location embedding distance. This operation thus combines the scores of object similarity and location similarity and is able to retrieve digital images that are not only semantically similar but also localized in a particular location in the image. In order to move the location of the object, the object may be translated a corresponding direction and amount in the segmentation mask. Scaling and rotation of the object is also supported using similar techniques.

Location Only Search

In another example, location only search is performed using the global mask embedding to retrieve nearest neighbor masks that are most similar. This amounts to retrieving images with objects in a particular location. Suppose digital images are desired in which the objects are limited to appearing in a top right of the digital image. Creating a mask of that region (e.g., which may be expressed as an embedding) supports a digital image search for digital images with objects in that region. The results may also be reordered by performing a second rescore of the returned results for an inverted embedding from the original query and reordering the results based on this new score. The higher scoring images after this operation are the ones where there are objects in the top right corner and there are no objects anywhere else in the digital image.

Shape Search

Shape search is useful when trying to locate exact shapes or poses. Therefore, in this example a local segmentation mask 408 (e.g., through use of local mask embeddings) are used for this search. The local segmentation mask 408 preserves object poses and shapes in the form of a silhouette. This means that a digital image search may be performed for specific object poses. For example, in order to locate a digital image including a coffee cup in a particular pose. This may be used in combination and semantic and global mask embeddings as described in the illustrated examples to find an object in a particular shape/pose in a specific part of the image. The local mask embedding can also be modified through interaction with the composition user interface 918 to search for varied poses of the same object.

Isolated Object Search

Extending the semantic plus location search can be performed to include object isolation. Again, this works as a rescore. A semantic similarity search is first performed, but rather than retrieving objects in a prescribed location defined by the global segmentation mask 406 (e.g., a global mask embedding), the returned results are rescored by negatively weighting the digital images where the inverse of the global segmentation mask 406 generate a high score. This means that digital images where the selected object or its nearest semantic match is the only object in the frame is retrieved as part of the search result 118 by the search module 806.

Combination Search Query

In a combination query search as described in relation to FIG. 9, a combination of semantic features for multiple objects are used. A user, for instance, may specify that the search results are to have one instance of one object and another instance of another object from the same digital image or from a different digital image. In the combined search, the search module 806 computes a nearest neighbor search 808 for each object and a digital image which has two similar objects scores higher.

Custom Location Search

Because global mask features can be generated efficiently by the object search module 120 on the fly in real time, this also supports an ability to receive users inputs as drawing on the composition user interface 918 to specify where objects are to be located, poses of the objects, shapes of the objects, and so on. This can be implemented using a continuous or discontinuous mask. Other types of digital image searches are also supported by the techniques described herein.

Human Similarity Search

In some instances, the content similarity model 230 is trained based on concepts and thus may perform well for non-human objects but have reduced accuracy for human-based objects, e.g., a selfie of a person. This is because tag-based embeddings function well at capturing concept similarity more than visual similarity. In the case of humans, this constitutes a significant amount of variation in the concepts. In a stock corpus, for instance, humans are present in a large set of images. Hence the tags associated with the humans are varied and therefore the concept representation of person, man, and/or woman is also varied. This form of unpredictability is not present when searching for objects because object variation is limited and typical objects are not found out of context in varied scenes.

Therefore, in order to address this issue semantic features of objects recognized as humans are weighted to be given a greater weight to a face as opposed to other portions of the human. For example, the object search module 120 may detect a human is represented in a digital image 114, e.g., through object recognition, and then give emphasis in a feature embedding through use of a weighting. As a result, search results have an increased likelihood of finding a person that "looks the same" as opposed to being weighted on other features, e.g., "wearing the same shirt." Other examples are also contemplated.

Example System and Device

Figure 13:
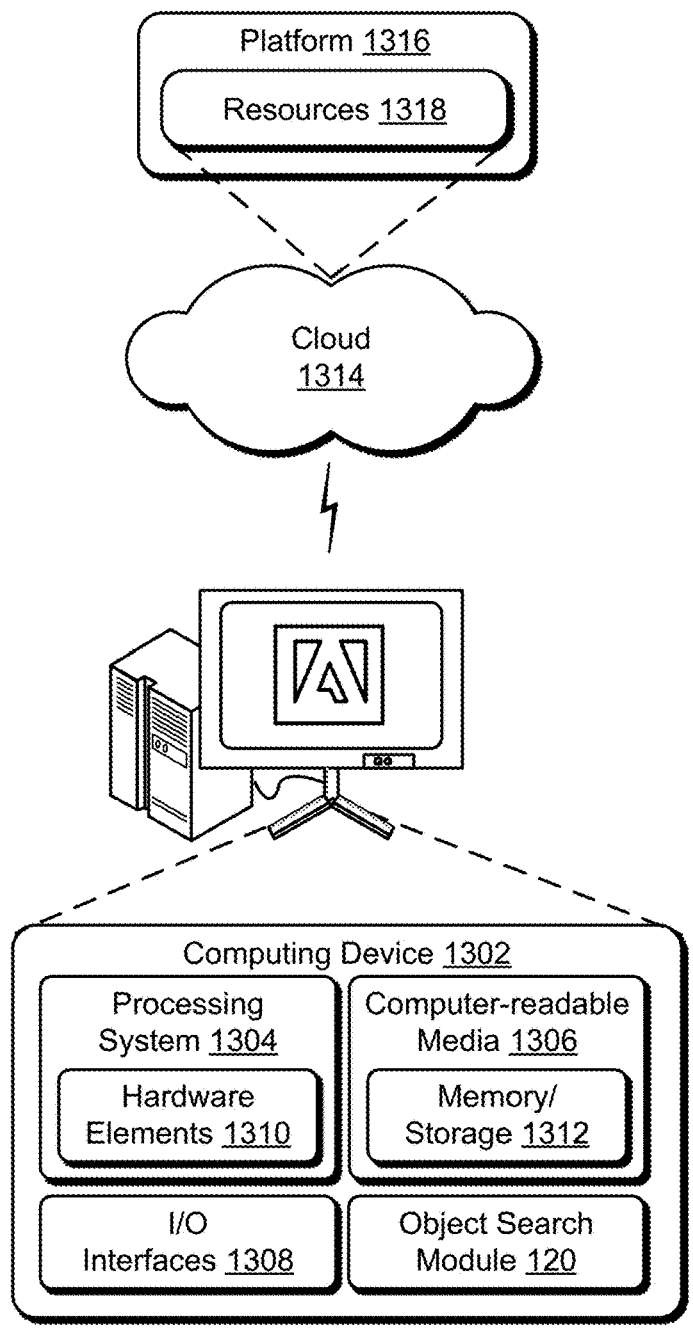
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the object search module 120. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium digital image search environment, a method implemented by a computing device, the method comprising:
    displaying, by the computing device, a digital image having a plurality of objects that are user selectable in a user interface;
    receiving, by the computing device, a user input via the user interface selecting at least one object from a plurality of objects;
    initiating, by the computing device, a digital image search based on a search query responsive to the user input, the search query including:
        an indication of a location of the at least one object within the digital image; and
        semantic features extracted from the at least one object, wherein the search query does not include semantic features extracted from at least one other object of the plurality of objects using machine learning; and
    displaying by the computing device, a search result including a subsequent digital image located based on the search query.

2. The method as described in claim 1, wherein the displaying of the digital image includes a plurality of indications that are user selectable for a respective object of the plurality of objects.

3. The method as describe in claim 2, wherein the plurality of indications is located as avoiding overlap of respective said objects.

4. The method as described in claim 1, further comprising:
receiving, by the computing device, a second user input via the user interface, by the computing device, changing a location of the at least one object; and
modifying, by the computing device, the indication of the search query to include the changed location.

5. The method as described in claim 1, further comprising:
receiving, by the computing device, a second user input via the user interface, changing a size of the at least one object; and
modifying, by the computing device, the indication of the search query to include the changed size of the at least one object.

6. The method as described in claim 1, further comprising:
receiving, by the computing device, a second user input changing a rotation of the at least one object; and
modifying, by the computing device, the indication of the search query to include the changed rotation of the at least one object.

7. The method as described in claim 1, wherein the indication of the location of the at least one object is indicated using a global segmentation mask and the search query further comprising a local segmentation mask having an amount of detail with respect to the at least one object that is greater than an amount of detail used for the at least one object in the global segmentation mask.

8. The method as described in claim 7, wherein the local segmentation mask describes a pose of the at least one object.

9. The method as described in claim 1, wherein the search result is generated via a digital image search by comparing:
the indication of the location of the at least one object within the digital image with an indication of a location of another object within the subsequent digital image; and
the semantic features extracted from the at least one object within the digital image with semantic features extracted from the other object within the subsequent digital image.

10. In a digital medium digital image search environment, a system comprising:
one or more processors; and
a memory having stored thereon instructions that, when executed by the one or more processors, cause the one or more processors to:
execute an object detection module implemented by a computing device to detect a plurality of objects in a digital image using object detection, wherein the object detection module is configured to generate a plurality of bounding boxes for the plurality of objects;
execute a mask generation module implemented by a computing device to form a plurality of segmentation masks, each said segmentation mask corresponding to a respective object of the plurality of objects, wherein the plurality of bounding boxes are passed as an input from the object detection module to the mask generation module;
execute a semantic feature generation module implemented by the computing device to generate semantic features for each of the plurality of objects, separately, based on the plurality of segmentation masks; and
execute a searchable digital image module implemented by the computing device to generate an object searchable digital image that includes the plurality of segmentation masks and semantic features associated with respective objects of the plurality of objects.

11. The system as described in claim 10, wherein the object searchable digital image includes a plurality of indications that are user selectable for respective object of the plurality of objects to initiate a search query that includes the segmentation mask and the semantic features associated with the respective object.

12. The system as described in claim 10, wherein a plurality of said object searchable digital images are generated and indexed to be searched using a search query.

13. The system as described in claim 10, wherein the mask generation module is configured to generate the plurality of segmentation masks as including:
a global segmentation mask for each said object that specifies a location in relation to the digital image; and
a local segmentation mask for each said object that specifies a pose.

14. The system as described in claim 10, wherein the semantic feature generation module is configured to generate semantic features for each of the plurality of objects having backgrounds removed based on respective said segmentation masks.

15. In a digital medium digital image search environment, a system comprising:
means for receiving a search query formed in response to an input initiated via user interaction via a user interface as selecting at least one object from a plurality of objects that are user selectable and included as part of a digital image; and
means for generating a search result responsive to the search query that includes a subsequent digital image, the generating means including
means for comparing an indication of a location of the at least one object from the search query with an indication of a location of another object within the subsequent digital image, wherein the search query includes the indication of the location using at least one segmentation mask and semantic features are generated based on the at least one object, and wherein the at least one segmentation mask includes a global segmentation mask and a local segmentation mask; and
means for comparing semantic features included in the search query that are extracted from the at least one object with semantic features extracted from the other object within the subsequent digital image.

16. The system as described in claim 15, wherein the generating means includes means for generating the search result using a nearest neighbor search.

17. The system as described in claim 10, wherein the search query does not include semantic features extracted from at least one other object of the plurality of objects using machine learning.

18. The system as described in claim 10, wherein the object detection module is configured to generate a plurality of bounding boxes for the plurality of objects, the plurality of bounding boxes passed as an input to the mask generation module.

19. The system as described in claim 15, wherein the search query does not include semantic features extracted from at least one other object of the plurality of objects using machine learning.

20. The system as described in claim 15, further comprising an object detection module configured to generate a plurality of bounding boxes for the plurality of objects, the plurality of bounding boxes passed as an input to a mask generation module used to form the a least one segmentation mask.

* * * * *